April 17, 1934.         L. TYLER         1,955,209

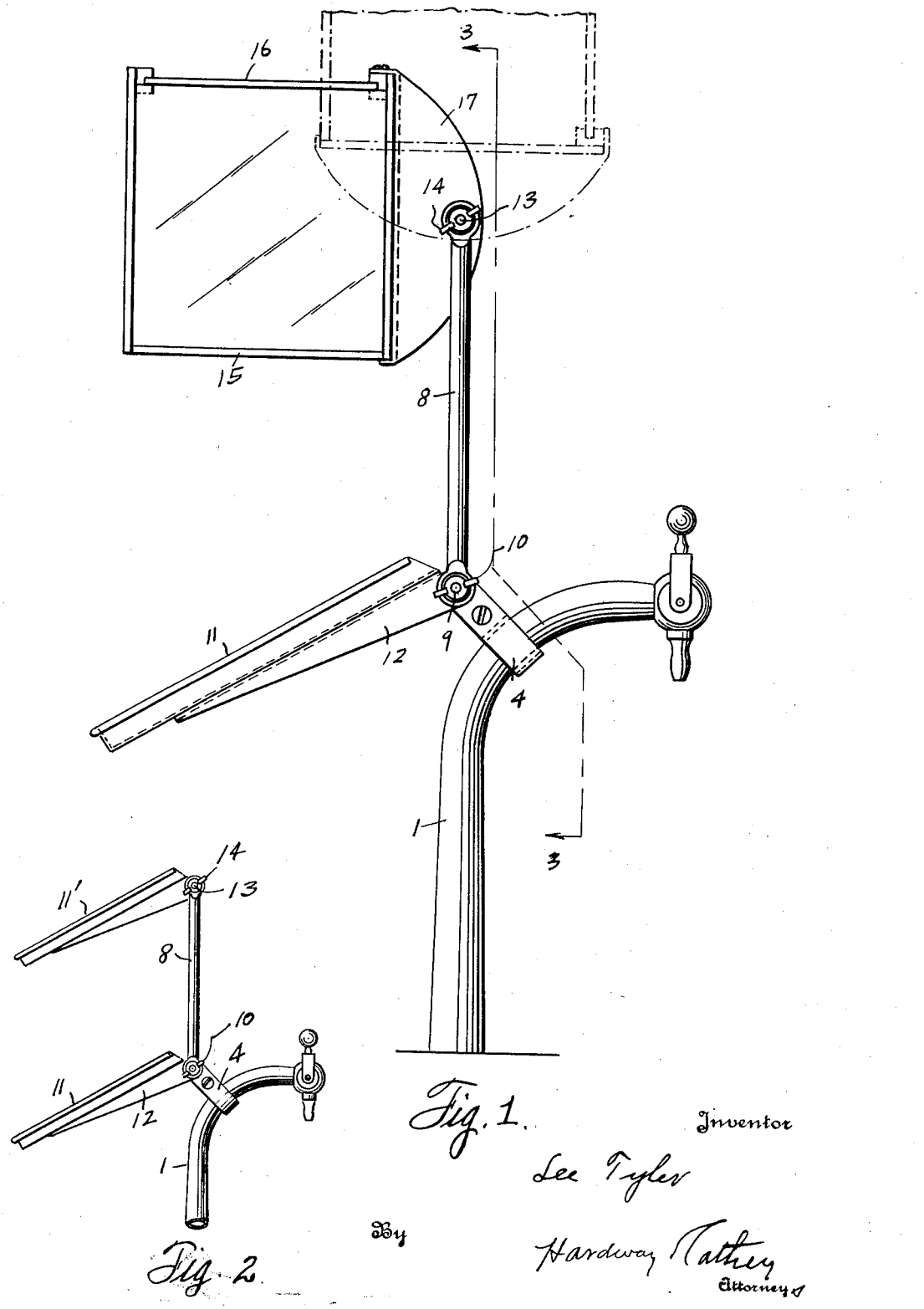

DISPLAY RACK

Filed March 20, 1931          2 Sheets-Sheet 2

Inventor
Lee Tyler
By Hardway Tathey
Attorneys

Patented Apr. 17, 1934

1,955,209

UNITED STATES PATENT OFFICE 1,955,209

DISPLAY RACK

Lee Tyler, Houston, Tex.

Application March 20, 1931, Serial No. 524,085

3 Claims. (Cl. 211—86)

This invention relates to a display rack.

One object of the invention is to provide a display rack specially designed for use in displaying merchandise in stores and at cold drink fountains, and similar places where display space is limited.

Another object of the invention is to provide a display rack specially designed to be attached to, and supported by, the stands of the dispensing faucets of a cold drink fountain, and which will thus be so located that hitherto unused space may be utilized for the display of merchandise to be sold.

With the above and other objects in view this invention has particular relation to certain novel features of construction, operation and arrangement of parts, an example of which is given in this specification and illustrated in the accompanying drawings, wherein:—

Figure 1 shows a side view of the rack.

Figure 2 shows a fragmentary side view of a modified form thereof.

Figure 4 shows a plan view of a form of display tray employed, and.

Figure 5 shows a sectional view taken on the line 5—5 of Figure 4.

Figure 3:
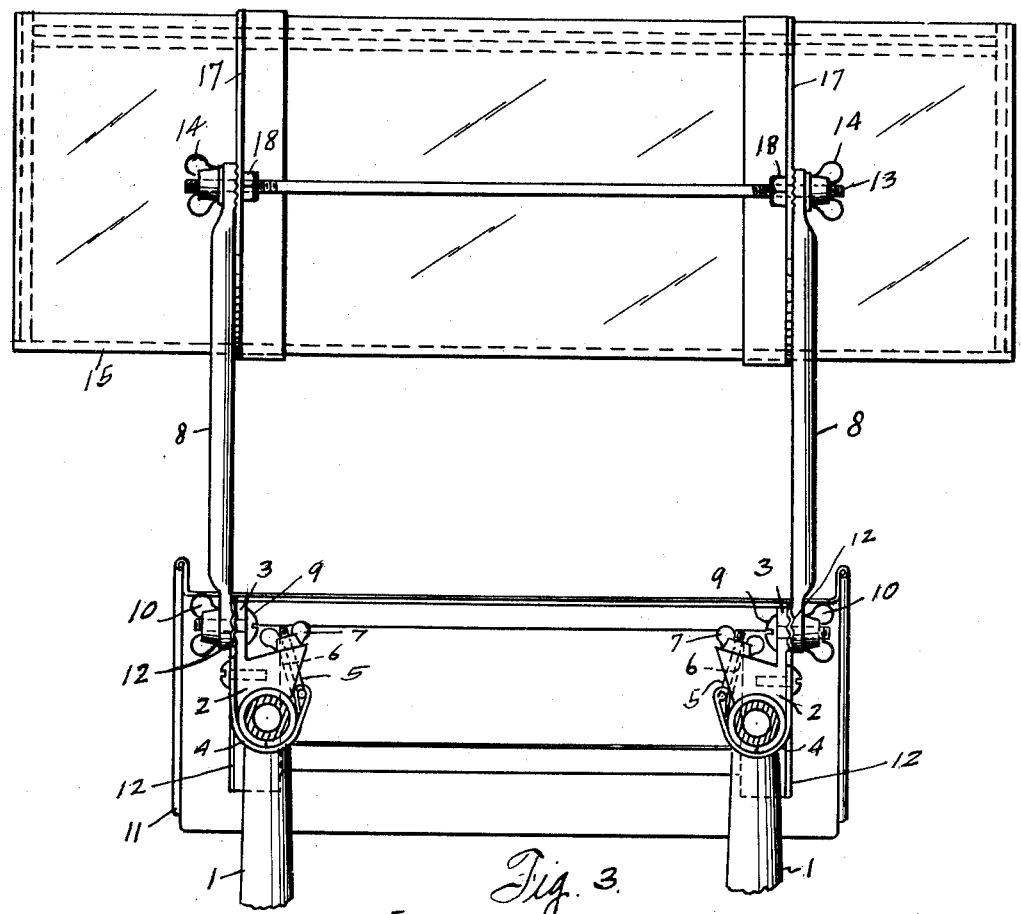
Figure 3 shows a vertical sectional view taken on the line 3—3 of Figure 1.

Referring now more particularly to the drawings wherein like numerals of reference designate similar parts in each of the figures, the numerals 1, 1 designate the stands of the dispensing faucets of a cold drink stand which, in the present illustration, serve as supports for the rack. Resting on these stands are the anchors 2, 2 whose lower ends are arcuate to fit said stands and whose upper ends have the outstanding lugs 3, 3. Arcuate straps 4, 4 are attached, at their outer ends to the outer sides of said anchors and these straps are clamped around said faucet stands and their inner ends have clamp bolts 5, 5 which work through bearings 6, 6, in the anchors 2, and are secured in place by the clamp nuts 7, 7.

There are the upstanding supporting posts 8, 8 whose lower ends are pivotally mounted on the clamp bolts 9, 9 which are fitted through bearings in the lugs 3 and whose outer ends have the nuts 10, 10 threaded thereon.

There is a display tray 11 having the end supporting arms 12, 12 whose rear ends are extended and have bearings on the bolts 9. These extended ends are clamped between the lugs 3 and the adjacent ends of the posts 8. The tray 11 may be readily adjusted to any desired position by loosening the nuts 10 and making the desired adjustment and then tightening said nuts.

The upper ends of the posts 8 have bearings to receive the transverse supporting rod 13 which is retained therein by the end nuts 14, 14. There is a box like container 15 having the sliding cover 16. This container also has the spaced wings 17, 17 on its rear side which have bearings on said rod 13. There are lock nuts 18, 18 on the rod 13 which lock against the inside of the wings 17 to secure the container 15 firmly in place. If desired an upper tray 11' may be substituted for the container 15 as shown in Figure 2.

Figures 4, 5:
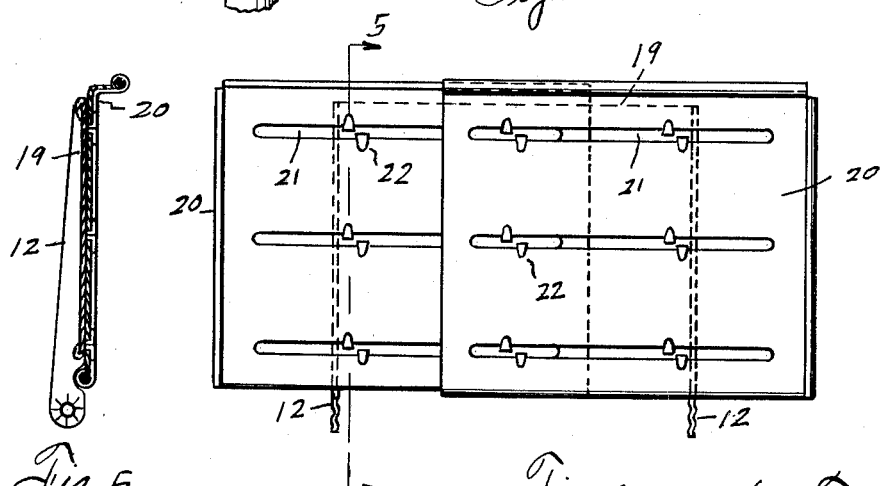

If desired a modified form of tray, shown in Figure 4 may be used. In this form a flat support 19 is supported by the arms 12 and a sectional tray is supported on said support. This tray may be composed of two sections 20, 20 adjustable, in any suitable manner, so as to lengthen and shorten the tray. A preferred method of mounting the two sections 20, 20 is shown in Figure 7. In this figure the sections 20 are shown with lengthwise registering slots and lugs 22 are thrown up from the material of the support 19 through said slots and overturned so as to maintain the sections 20 in assembled relation with said plate 19 and to permit the lengthwise adjustment of said sections.

The container 15 may be readily swung up in vertical position as shown in dotted lines in Figure 1, by loosening the nuts 14 and the merchandise to be displayed may be placed therein and said container then adjusted back in horizontal position as shown in full lines in Figure 1.

The drawings and description disclose what is now considered to be a preferred form of the invention by way of illustration only, while the broad principle of the invention will be defined by the appended claims.

What I claim is:

1. A display rack comprising an anchor, a clamp strap secured, at one end, to the anchor, means for releasably securing the other end of the strap to said anchor, a display tray adjustably attached to the anchor, a pivotally mounted post on and upstanding from the anchor and a display tray adjustably mounted on said post.

2. A display rack comprising a pair of clamps adapted to be clamped around spaced supports, a post upstanding from each clamp, a plurality of forwardly declining trays between said posts, and means for adjustably and pivotally connecting said trays to said posts.

3. A display rack comprising a pair of clamps adapted to be secured to spaced supports, a post upstanding from and pivotally connected to each clamp, a forwardly declining tray between said clamps, means adjustably and pivotally connecting said posts and tray to said clamps, a forwardly declining tray between posts and means for pivotally and adjustably connecting said last mentioned tray to said posts.

LEE TYLER.